United States Patent
Huang et al.

(10) Patent No.: US 9,794,790 B2
(45) Date of Patent: *Oct. 17, 2017

(54) WIRELESS DEVICE, METHOD, AND COMPUTER READABLE MEDIA FOR SPATIAL REUSE FOR DEVICE-TO-DEVICE LINKS

(71) Applicant: Intel IP Corporation, Santa Clara, CA (US)

(72) Inventors: Po-Kai Huang, West Lafayette, IN (US); Robert J. Stacey, Portland, OR (US); Qinghua Li, San Ramon, CA (US); Rongzhen Yang, Shanghai (CN)

(73) Assignee: Intel IP Corporation, Santa Clara, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/745,743

(22) Filed: Jun. 22, 2015

(65) Prior Publication Data

US 2016/0127909 A1    May 5, 2016

Related U.S. Application Data

(60) Provisional application No. 62/072,318, filed on Oct. 29, 2014.

(51) Int. Cl.
*H04W 16/02* (2009.01)
*H04W 72/04* (2009.01)
(Continued)

(52) U.S. Cl.
CPC .......... *H04W 16/02* (2013.01); *H04L 5/0062* (2013.01); *H04W 28/0236* (2013.01);
(Continued)

(58) Field of Classification Search
CPC ........... H04W 72/0453; H04W 72/046; H04W 72/04; H04W 76/023; H04W 76/043;
(Continued)

(56) References Cited

U.S. PATENT DOCUMENTS

2010/0157907 A1* 6/2010 Taghavi Nasrabadi .. H04B 1/69
370/328
2011/0116393 A1* 5/2011 Hong ................... H04W 72/082
370/252

(Continued)

FOREIGN PATENT DOCUMENTS

| WO | WO-2012128505 A2 | 9/2012 |
| WO | WO-2013081370 A1 | 6/2013 |
| WO | WO-2014126776 A1 | 8/2014 |

OTHER PUBLICATIONS

"International Application No. PCT/US2015/050681, International Search Report dated Dec. 23, 2015", 10 pgs.

(Continued)

*Primary Examiner* — Ashley Shivers
(74) *Attorney, Agent, or Firm* — Schwegman Lundberg & Woessner, P.A.

(57) ABSTRACT

Methods, computer readable media, and apparatuses are disclosed for spatial reuse. A high efficiency station (HE STA) that includes circuitry is disclosed. The circuitry may be configured to: determine if a link with a wireless device is a D2D link with a spatial reuse opportunity; and transmit a packet that includes an indication that there is the spatial reuse opportunity for the duration of the packet, if the link with the wireless device is the D2D link with the spatial reuse opportunity. The circuitry may be configured to: receive a packet from a second HE STA, where the packet includes an indication that there is a spatial opportunity for the duration of the packet; adjust at least one of the following group: a transmit power and a clear channel assessment (Continued)

parameter; and transmit a second packet to a wireless device in the spatial opportunity in accordance with D2D communication.

25 Claims, 12 Drawing Sheets

(51) Int. Cl.
| | |
|---|---|
| *H04W 40/16* | (2009.01) |
| *H04W 72/08* | (2009.01) |
| *H04W 76/02* | (2009.01) |
| *H04W 76/04* | (2009.01) |
| *H04W 28/02* | (2009.01) |
| *H04W 72/12* | (2009.01) |
| *H04W 84/12* | (2009.01) |
| *H04W 84/20* | (2009.01) |
| *H04L 5/00* | (2006.01) |
| *H04L 27/26* | (2006.01) |

(52) U.S. Cl.
CPC ......... *H04W 40/16* (2013.01); *H04W 72/046* (2013.01); *H04W 72/082* (2013.01); *H04W 72/1231* (2013.01); *H04W 76/023* (2013.01); *H04W 76/043* (2013.01); *H04L 5/0007* (2013.01); *H04L 5/0091* (2013.01); *H04L 27/261* (2013.01); *H04W 84/12* (2013.01); *H04W 84/20* (2013.01)

(58) Field of Classification Search
CPC ........... H04W 28/0236; H04W 28/048; H04W 40/16; H04W 72/082
See application file for complete search history.

(56) References Cited

U.S. PATENT DOCUMENTS

| | | | |
|---|---|---|---|
| 2011/0205962 A1* | 8/2011 | Das | H04W 74/00 370/328 |
| 2012/0093098 A1 | 4/2012 | Charbit et al. | |
| 2014/0295858 A1* | 10/2014 | Li | H04W 74/08 455/450 |
| 2016/0270030 A1* | 9/2016 | Yu | H04W 72/005 |

OTHER PUBLICATIONS

"International Application No. PCT/US2015/050681, Written Opinion dated Dec. 23, 2015", 7 pgs.

* cited by examiner

WIRELESS DEVICE, METHOD, AND COMPUTER READABLE MEDIA FOR SPATIAL REUSE FOR DEVICE-TO-DEVICE LINKS

PRIORITY CLAIM

This application claims the benefit of priority under 35 USC 119(e) to U.S. Provisional Patent Application Ser. No. 62/072,318, filed Oct. 29, 2014, which is incorporated herein by reference in its entirety.

TECHNICAL FIELD

Embodiments pertain to wireless communications in a wireless local-area network (WLAN). Some embodiments relate to spatial reuse. Some embodiments relate to spatial reuse for device-to-device (D2D) communication. Some embodiments relate to Institute of Electrical and Electronic Engineers (IEEE) 802.11 and some embodiments relate to IEEE 802.11ax.

BACKGROUND

Users of wireless networks often demand more bandwidth and faster response times. However, the available bandwidth may be limited. Moreover, there are more and more wireless devices operating close to one another. Additionally, wireless devices may operate with different communication standards.

Thus, there are general needs for systems and methods for efficiently using the wireless medium, and in particularly, spatially re-using the wireless medium.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
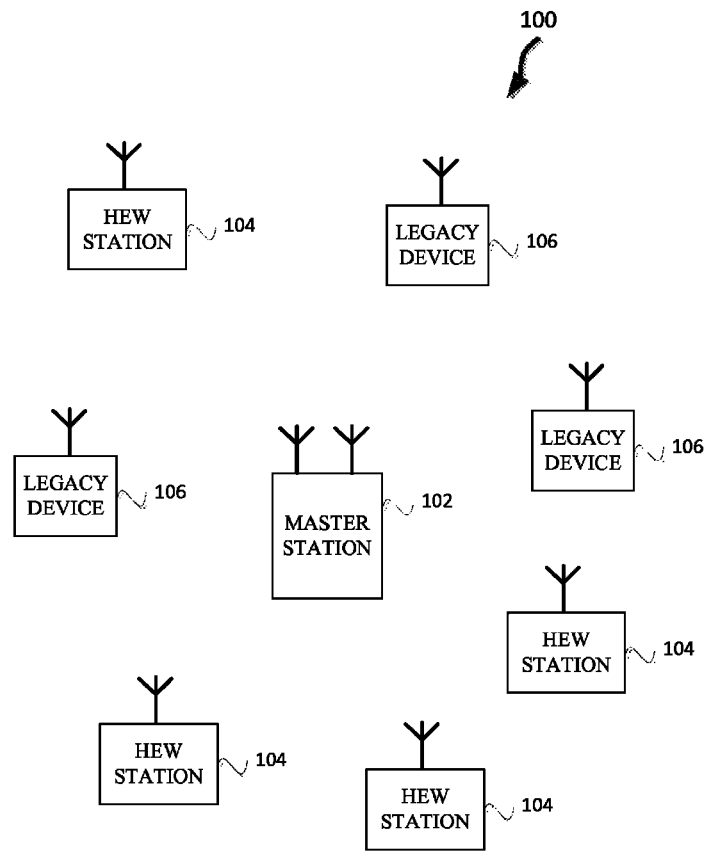
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using OFDMA, time division multiple access (TDMA), and/or code division multiple access (CDMA). The IEEE 802.11 protocol may include a multiple access technique. For example, the IEEE 802.11 protocol may include space-division multiple access (SDMA) and/or MU-MIMO.

The legacy devices 106 may operate in accordance with one or more of IEEE 802.11a/g/ag/n/ac, or another legacy wireless communication standard. The legacy devices 106 may be STAs or IEEE STAs.

The HEW STAs 104 may be wireless transmit and receive devices such as cellular telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The BSS 100 may operate on a primary channel and one or more secondary channels or sub-channels. The BSS 100 may include one or more master stations 102. In accordance with some embodiments, the master station 102 may communicate with one or more of the HEW devices 104 on one or more of the secondary channels or sub-channels or the primary channel. In accordance with some embodiments, the master station 102 communicates with the legacy devices 106 on the primary channel. In accordance with some embodiments, the master station 102 may be configured to communicate concurrently with one or more of the HEW STAs 104 on one or more of the secondary channels and a legacy device 106 utilizing only the primary channel and not utilizing any of the secondary channels.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth as a sub-channel, and the bandwidth may be one of 20 MHz, 40 MHz, or 80 MHz, 160

MHz, 320 MHz contiguous bandwidths or an 80+80 MHz (160 MHz) non-contiguous bandwidth. In some embodiments, bandwidths of 1 MHz, 1.25 MHz, 2.0 MHz, 2.5 MHz, 5 MHz and 10 MHz, or a combination thereof or another bandwidth that is less or equal to the available bandwidth, may also be used. A HEW frame may be configured for transmitting a number of spatial streams, which may be in accordance with MU-MIMO.

In other embodiments, the master station 102, HEW STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period.

The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating. In accordance with some embodiments, during the master-sync transmission the HEW STAs 104 may contend for the wireless medium with the legacy devices 106 being excluded from contending for the wireless medium during the master-sync transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW station 104 and master station 102 are configured to perform one or more of the functions and/or methods described herein for D2D spatial reuse such as the methods, apparatuses, and functions described in conjunction with FIGS. 1 through 13.

Figure 2:
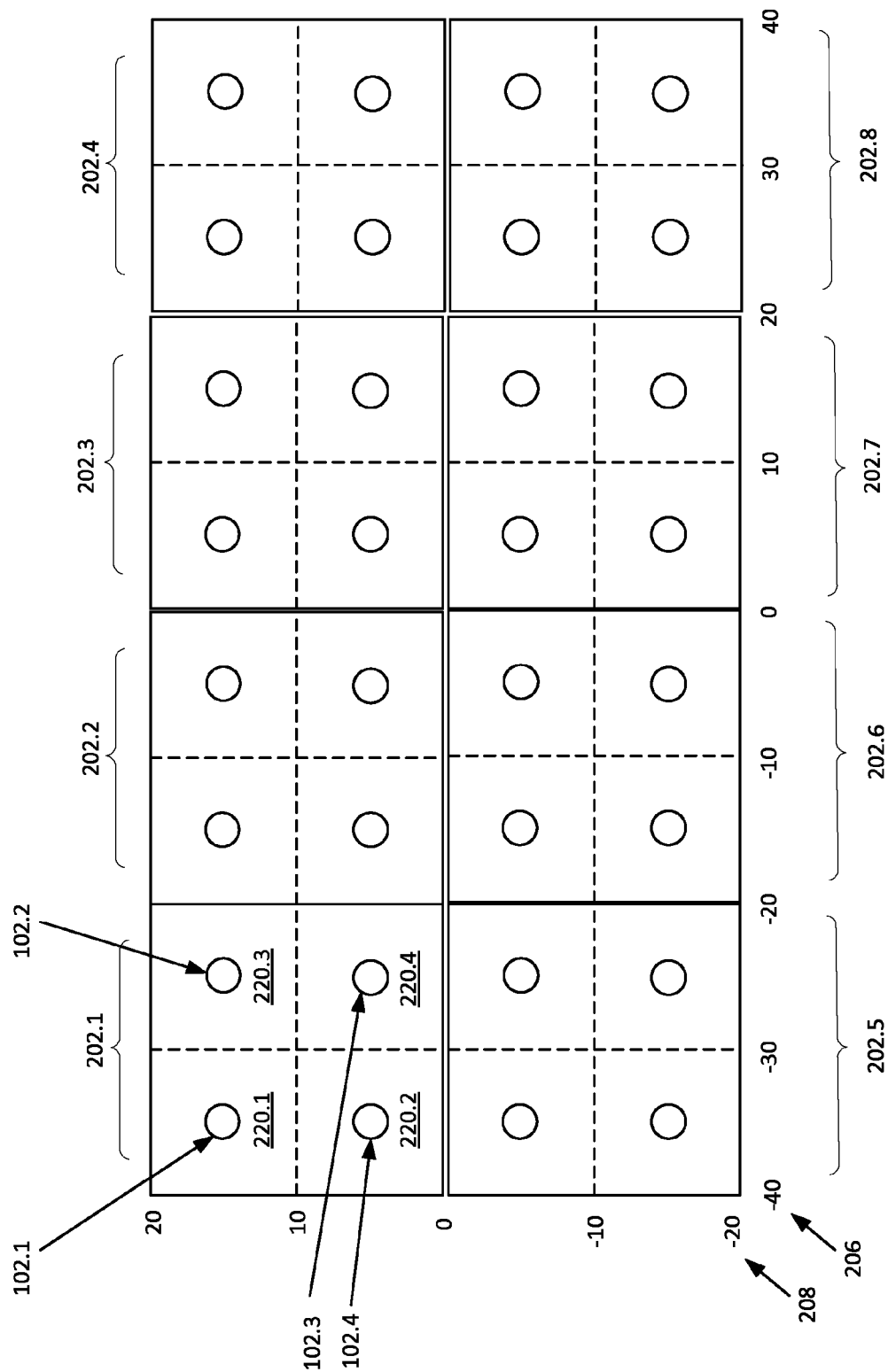
FIG. 2 illustrates eight offices in accordance with some embodiments.

FIG. 2 illustrates eight offices 202.1 through 202.8 in accordance with some embodiments. Illustrated along the horizontal axis 206 and vertical axis 208 are distance in meters. Each office 202 has four rooms 220 and four master stations 102 with one master station 102 per room 204. For example, office 202.1 includes four rooms 220.1 through 220.4 with each room 220 including a master station 102.1 through 102.4, respectively. In example embodiments, the eight offices may be a different size.

Figure 3:
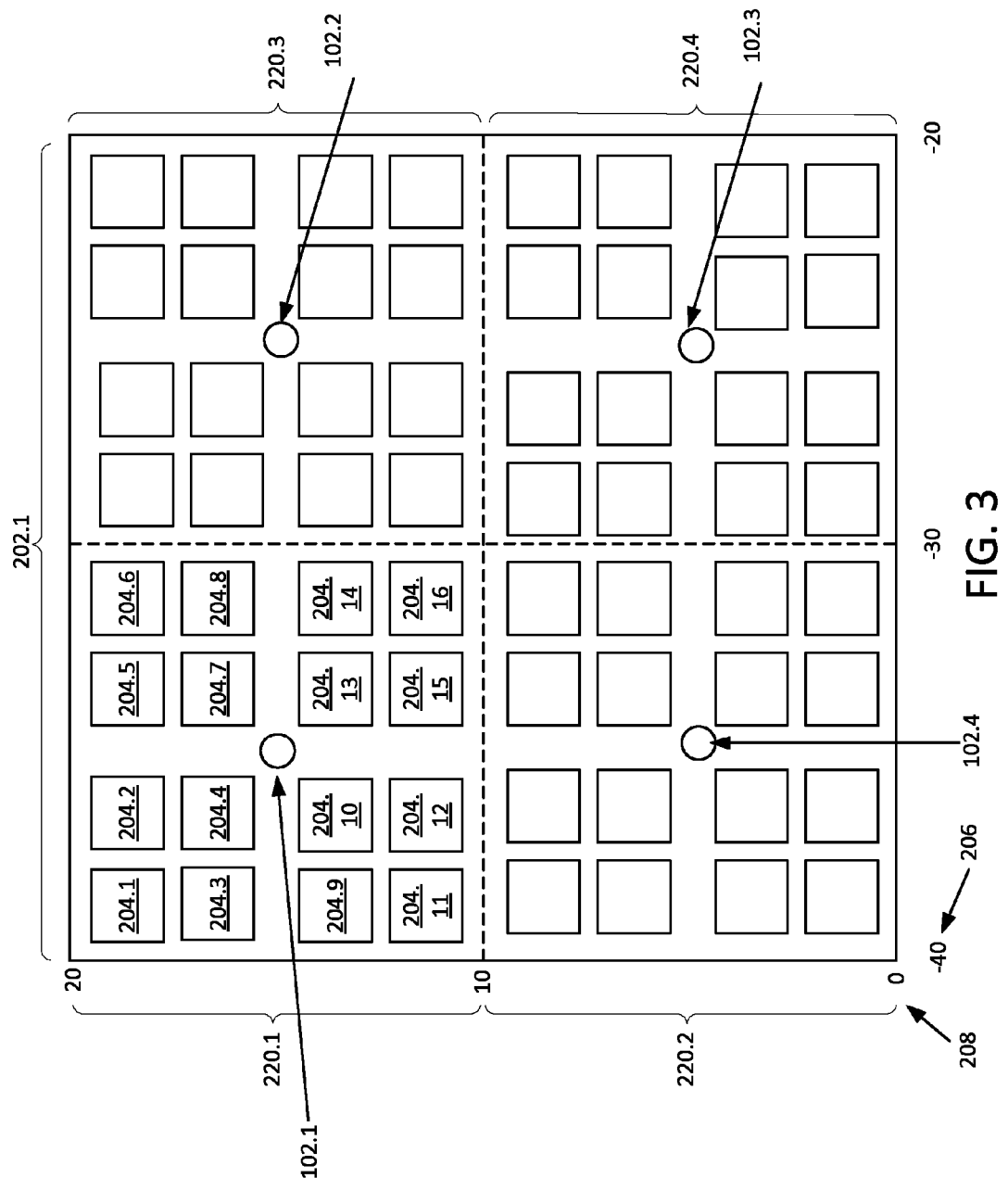
FIG. 3 illustrates an office of the eight offices of FIG. 2 in accordance with some embodiments.

FIG. 3 illustrates an office 202.1 of the eight offices 202 of FIG. 2 in accordance with some embodiments. Illustrated along the horizontal axis 206 and vertical axis 208 are distance in meters. Office 202.1 includes four rooms 220.1 through 220.4, and each room 220 includes sixteen cubicles 204.1 through 204.16 and one master station 102.1. In example embodiments, each master station 102 may use a different 80 MHz channels in 5 GHz band. In example embodiments, the eight offices may be a different size. In example embodiments, there may be a different number of rooms 220 and/or a different number of cubicles 204.

Figure 4:
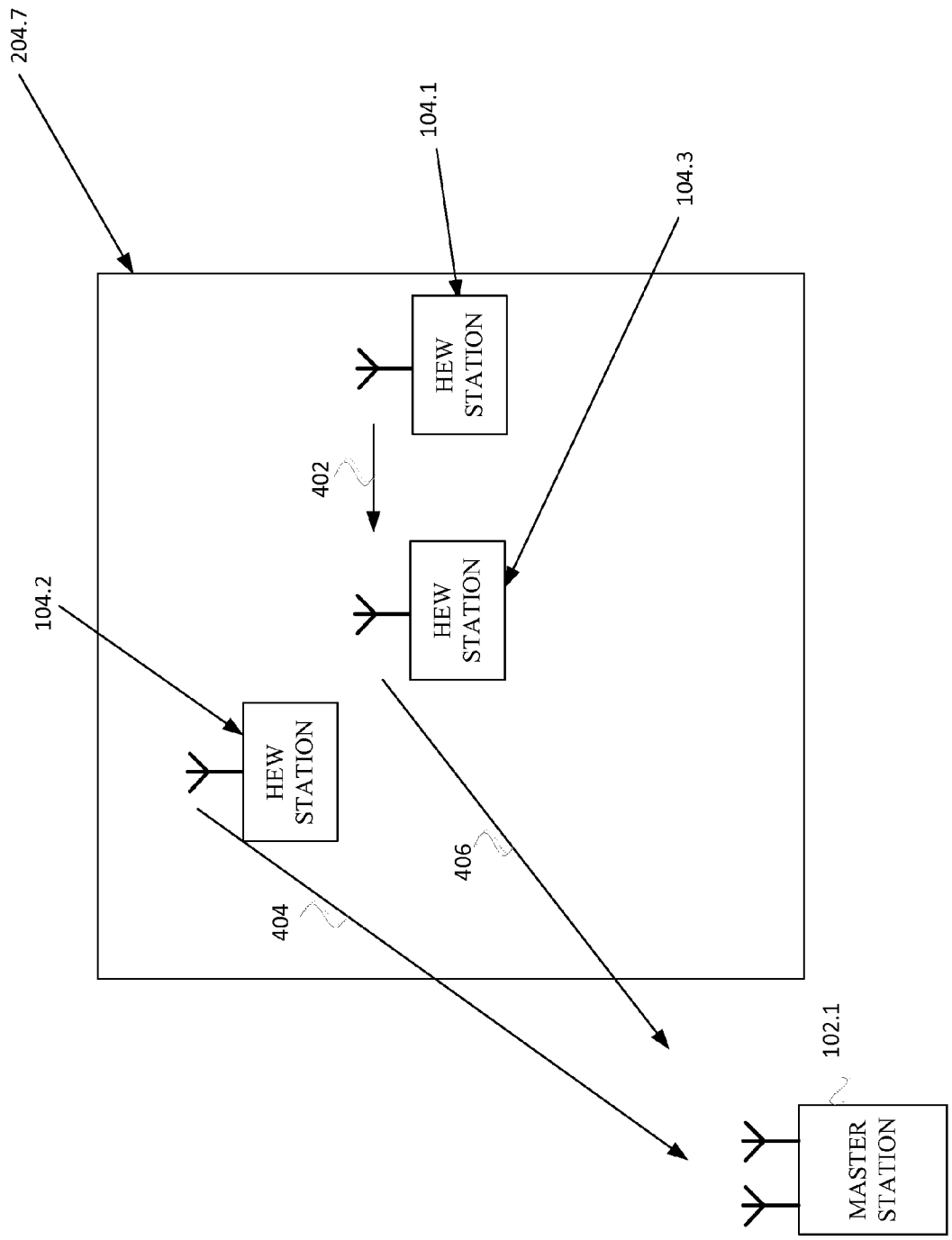
FIG. 4 illustrates a cubicle in accordance with some embodiments.

FIG. 4 illustrates a cubicle 204.3 in accordance with some embodiments. Each cubicle 204.7 may have three HEW stations 104.1, 104.2, and 104.3. One HEW station 104.1 may be transferring data to another HEW station 104.3 using a D2D link 402, and two HEW stations 104.2, 104.3 may be transferring data to the master station 102 using non D2D links 404, 406, which may be uplink data transmissions to the master station 102. In example embodiments, there may be a different number of HEW stations 104.

Figure 5:
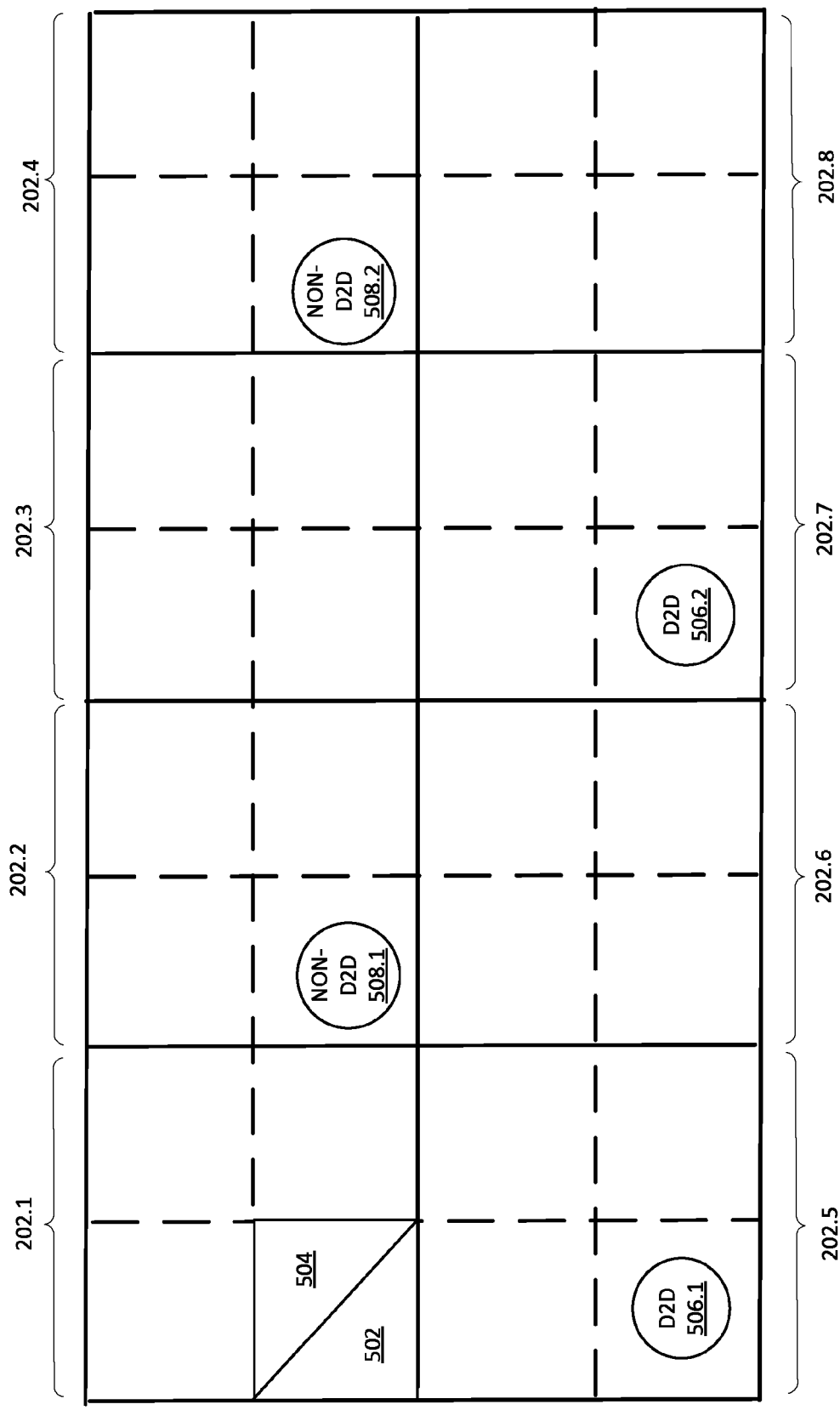
FIG. 5 illustrates a transmission topology for one channel in accordance with some embodiments.

FIG. 5 illustrates a transmission topology for one channel in accordance with some embodiments. Illustrated in FIG. 5 are the offices 202.1 through 202.8 illustrated in FIG. 2, a first region 502, a second region 504, D2D 506 links, and non-D2D 508 links.

Based on signal strength calculation, the arriving signal strength of a D2D link at two meters is −41 dBm. The first region 502 may be a region that can defer for D2D link 506.1 and the second region 504 may be a region that can defer for non D2D 508.1. The signal strength from D2D 506.1 to the first region 502 may be around −72 dBm. This implies that a D2D transmission from the first region 502 would generate around −72 dBm to the D2D 506.1. The interference generated from a diagonal office would be around −84 dBm.

For spatial reuse (SR) D2D in the first region 502, if it reduces power by 9 dB, then its interference to D2D 506.1 would be around −81 dBm. This may give D2D 506.1 a SINR of around 40 dB, which will enable it to transmit using modulation and coding scheme 9 (MCS9) of the IEEE 802.11 protocol. The signal strength of SR D2D in the first region 502 will become −50 dBm, and the interference will be around −72 dBm. Hence, the SINR of SR D2D in the first region 502 would be around 22 dBm, which would enable use of MCS3. MCS9 may enable a communication rate of 390 million bits per second (Mbps). MCS3 may enable a communication rate of 117 Mbps.

Figure 6:
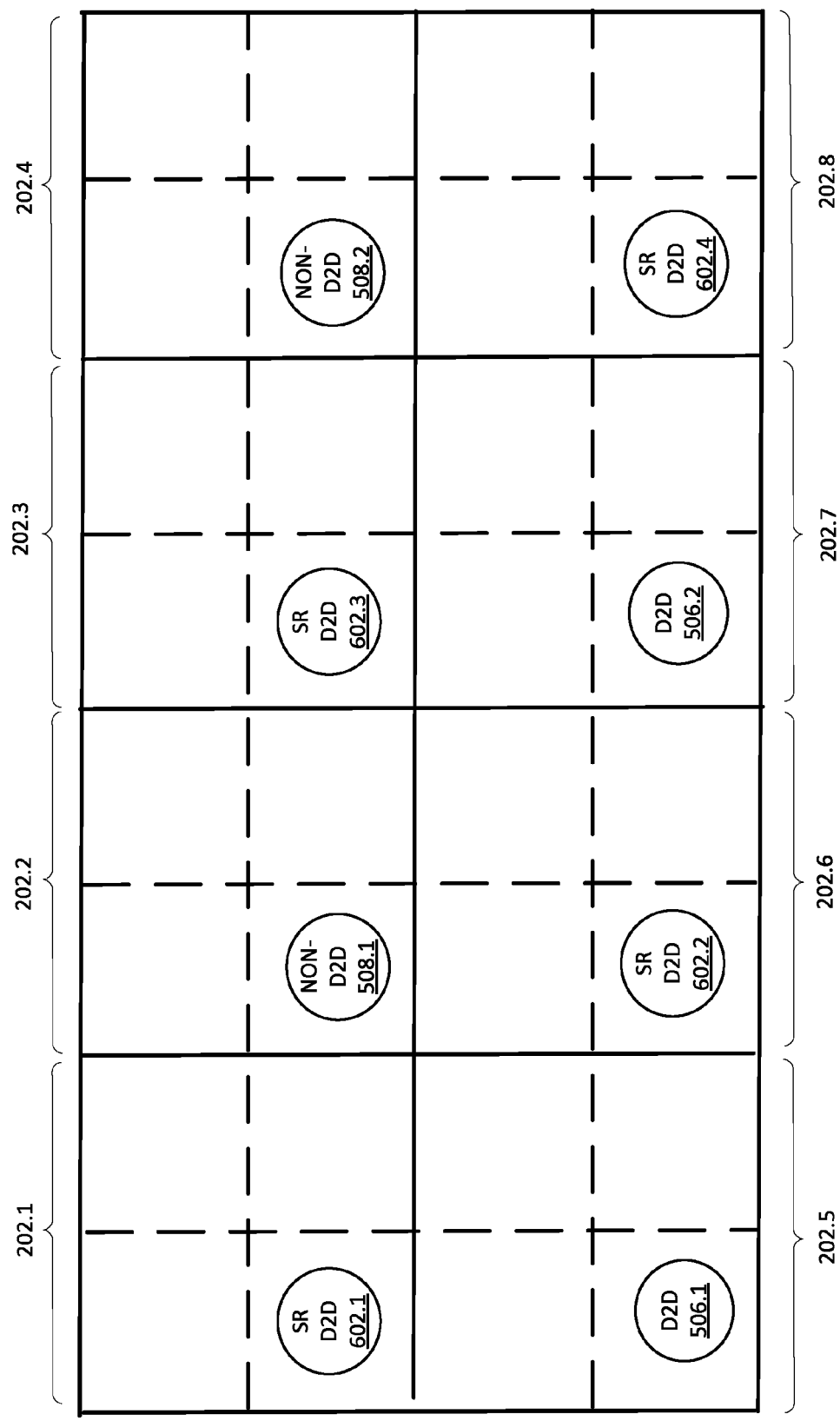
FIG. 6 illustrates a transmission topology according to example embodiments.

FIG. 6 illustrates a transmission topology according to example embodiments. Illustrated in FIG. 6 are the eight rooms of FIG. 5, SR D2D 602, and non-D2D 508. SR D2Ds 602 are spatially reusing the same sub-channel or channel of the bandwidth as D2D 506. In some embodiments, the SR D2D 602 may reduce their power transmission level. In some embodiments, the D2D 506 may reduce their power transmission level.

Spatially reusing the sub-channel or channel in accordance with example embodiments enables four additional SR D2D 602 links in the eight offices illustrated in FIG. 2. On average, for each D2D 506 link, two SR D2D 602 links may be added in a typical office topology. In example embodiments, the overall D2D throughput may be increased by 60% (390 Mpbs for D2D 506+2*117 for SR D2D 602) divided by 390 Mpbs=60%). In example embodiments, the above computation may be changed by adding shadow fading, which, in example embodiments, will not affect the outcome of being able to add 2 SR D2D 602 per D2D 506.

In example embodiments, the performance of the original D2D 506 links may not be affected due to power control of SR D2D 602 links. In example embodiments, the performance of non D2D 508 links also may not be affected due to power control of SR D2D 602 links.

Figure 7:
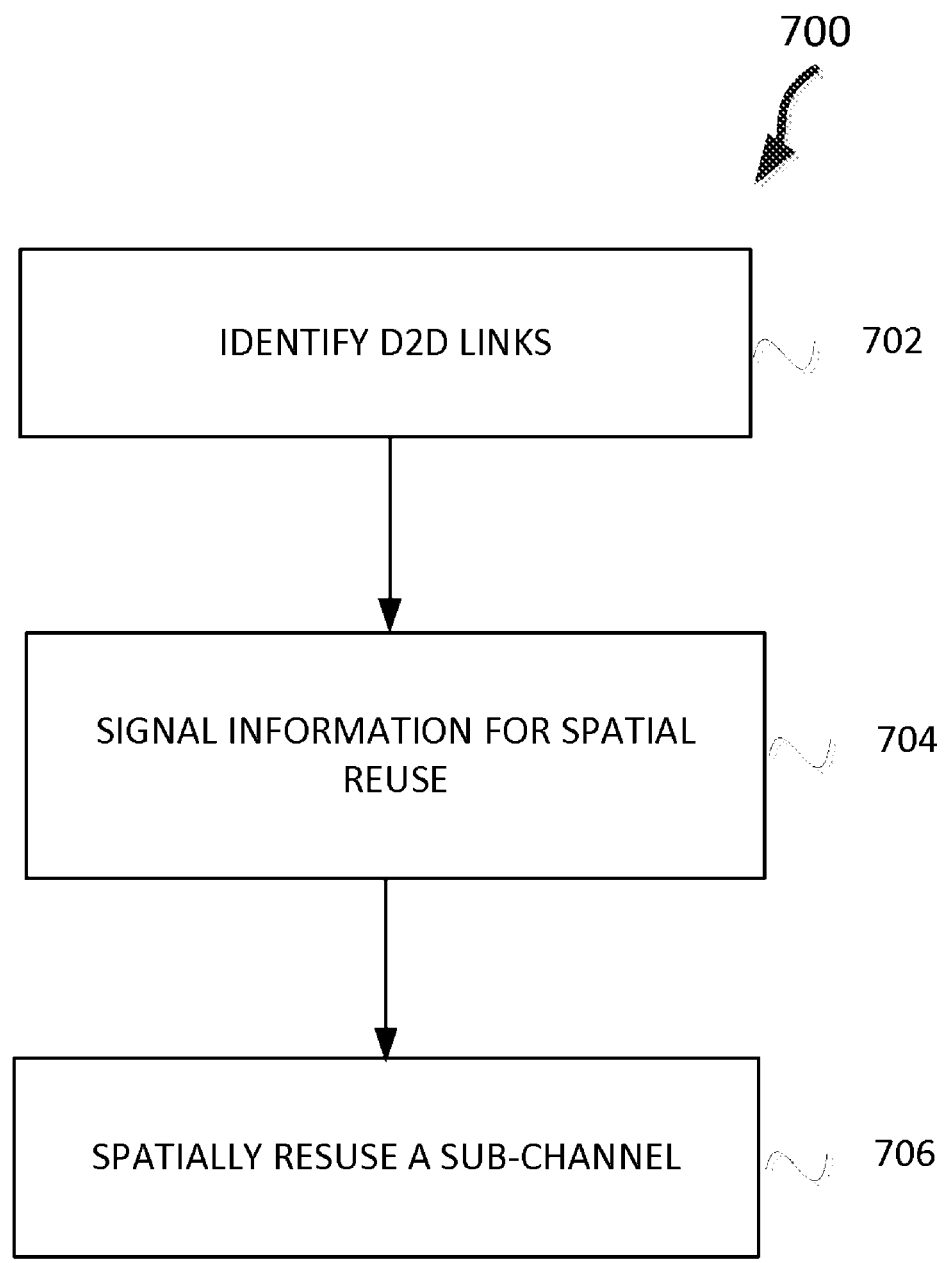
FIG. 7 illustrates a method for spatial reuse for device-to-device links in accordance with some embodiments.
Figure 8:
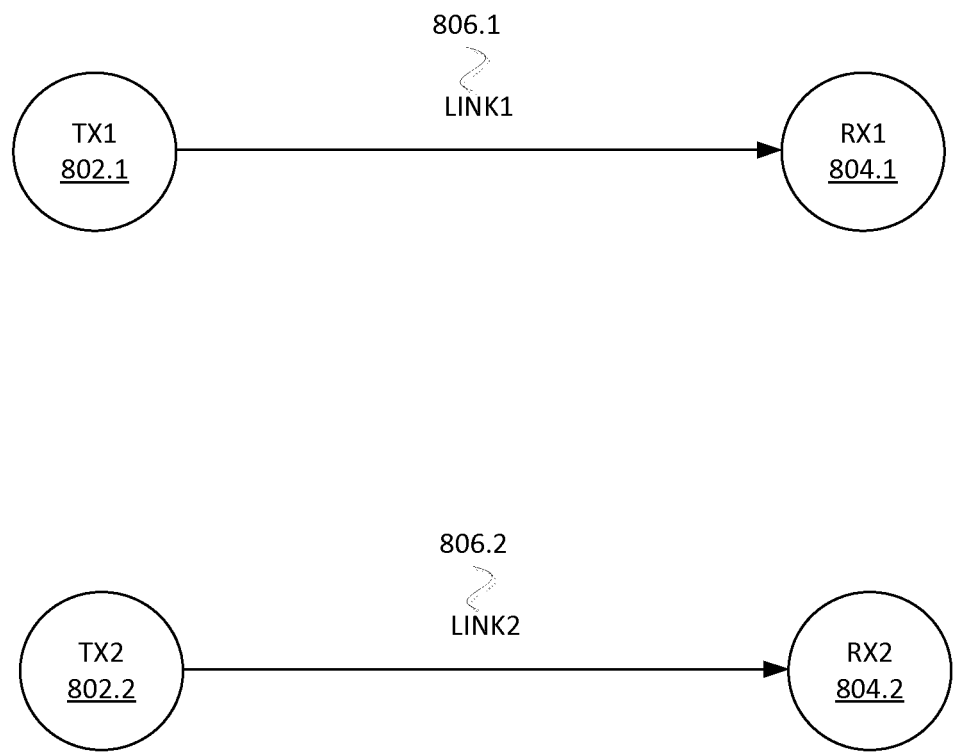
FIG. 8 illustrates two links in accordance with some embodiment.
Figure 9:
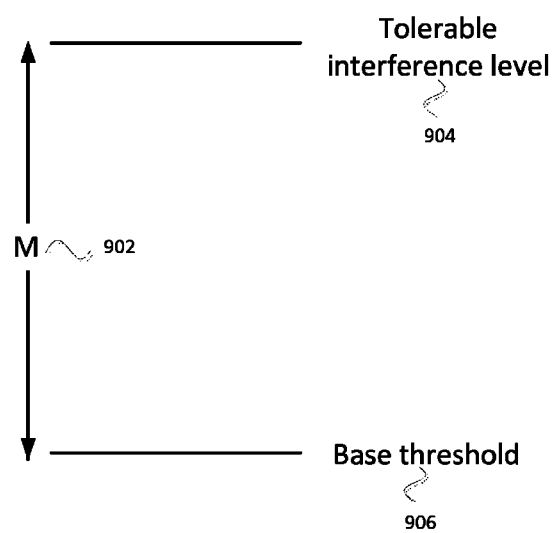
FIG. 9 illustrates the margin as a tolerable interference level above a base threshold.
Figure 10:
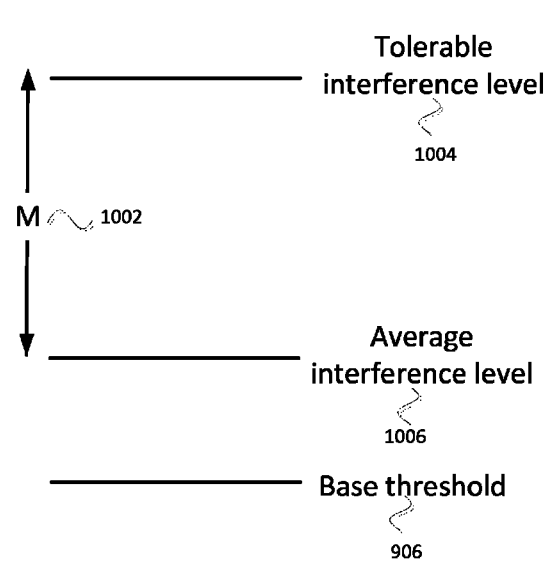
FIG. 10 illustrates the margin as an additional interference above an average interference level.

FIG. 7 illustrates a method 700 for spatial reuse for device-to-device links in accordance with some embodiments. FIG. 7 will be described in conjunction with FIGS. 8-12. FIG. 8 illustrates two links 806 in accordance with some embodiments. TX1 802.1, TX2 802.2, RX1 804.1, and RX2 804.2 may be HEW stations 104 or legacy devices 106. Link1 806.1 and link2 806.2 may be links between TX1 802.1, TX2 802.2, and RX1 804.1, RX2 804.2, respectively. Link1 806.1 and link2 806.2 may be D2D links. FIGS. 9 and 10 illustrate margins 902, 1002 in accordance with some embodiments.

The method begins at operation 702 with identify D2D links. D2D links are identified so that another link can potentially spatially reuse the same or an overlapping sub-channel or channel. The transmitter (TX) such as TX1 802.1 may determine whether or not link1 806.1 is a D2D link.

If the signal strength is high such as −36 dBm to −44 dBm for 1 meter to 3 meter distance, then the signal strength may be determined to be high. For example, the link1 806.1 may be a D2D link. In some embodiments, a threshold value for signal strength is determined, and if the signal strength is higher than the threshold value, then the TX may identify the link as a D2D link.

In some embodiments, the receiver (RX) such as RX1 804.1 measures the signal strength and compares it with the threshold. If the signal strength is higher than the threshold, then the RX may send this information to the TX. For example, RX1 804.1 may receive a transmission over link1 806.1 from TX1 802.1. RX1 804.1 may measure the signal strength of the transmission and compare the signal strength with a threshold value. The RX1 804.1 may then send a packet to the TX1 802.1 that indicates that link1 806.1 is a D2D link. For example, the RX1 804.1 may use one bit in a field that may be unused in a frame such as an acknowledgement frame, a block acknowledgement frame, a clear-to-send frame, a control frame, or a management frame.

In some embodiments, the TX such as TX1 802.1 may receive information regarding the signal strength of a transmission sent to a RX such as RX1 804.1 using link1 806.1. For example, the RX1 804.1 may send the TX1 802.1 a link measurement report. The TX1 802.1 may have a threshold for the link margin, and if the link margin is greater than the threshold determine that the link1 806.1 is a D2D link.

In some embodiments, the TX such as TX1 802.1 may determine whether the link1 806.1 is a D2D link based on the signal strength of feedback from the RX such as RX1 804.1. To determine the signal strength, the TX1 802.1 needs the transmitting power used by the RX1 804.1. TX1 802.1 may receive the transmitting power used by the RX1 804.1 from a report from the RX1 804.1 such as a transmitter power control (TPC) report element in an action frame.

The method 700 may continue at operation 704 with signal information for spatial reuse. For example, the TX such as TX1 802.1 may signal information for spatial reuse in a high efficiency (HE) signal field (HE-SIG) or a media access control (MAC) header. TX1 802.1 may use one bit to signal that there is a spatial reuse opportunity. TX1 802.1 may use a margin field to indicate that a spatial reuse opportunity is available. For example, in some embodiments, the TX1 802.1 may indicate a spatial opportunity is available if a margin field is greater than zero.

The margin may indicate the tolerable interference level above a base threshold such as, for example, the signal detect threshold. FIG. 9 illustrates the margin 902 as a tolerable interference level 904 above a base threshold 906. The base threshold 906 may be a known threshold value. The tolerable interference level 904 may be determined by the TX1 802.1 based on the TX's characteristics and/or recent communications of the TX. The tolerable interference level 904 may be a known tolerable interference level 904 for a particularly MCS the TX is using or intends to use.

The margin may indicate an additional interference that can be tolerated by the TX. FIG. 10 illustrates the margin 1002 as an additional interference above an average interference level 1006. Illustrated in FIG. 10 are M 1002, tolerable interference level 1004, average interference level 1006, and base threshold 906. The average interference level 1006 may be an average amount of interference the TX has been experiencing. The average interference level 1006 may be determined based on feedback from the RX such as RX1 804.1. The tolerable interference level 1004 may be an amount of interference the TX determines the TX can tolerate. In some embodiments, the tolerable interference level may be based on a MCS level. For example, the tolerable interference level 1004 may be an interference level that if reached or surpassed would mean the TX would switch to a lower MCS level. M 1002 may be the margin or amount of additional interference the TX may receive before reaching the tolerable interference level 1004.

In some embodiments, the value of M may be signaled with 5 bits to indicate a value from 0 to 31 dB with 1 dB increments. In some embodiments, the value of M may be signaled with 4 bits to indicate a value from 0 to 30 dB with 2 dB increments. In some embodiments, some bits may indicate a base and some bits may indicate a multiplier such as M=base*multiplier. For example, 3 bits may be used to indicate a base from 0 to 7 and 2 bits may be used to indicate a multiplier where the multiplier may be one plus the binary number represented by the multiplier bits.

In some embodiments, if a bit is used to indicate whether or not a D2D spatial reuse opportunity is available, the bits for the value of M may be ignored or absent if the bit indicates there is not a D2D spatial reuse opportunity.

In some embodiments, the TX such as TX1 802.1 may signal TX power information. For example, the TX1 802.1 may signal the TX power information in a HE-SIG to TX2 802.2. The TX power may be represented as a predefined unit. For example, 10 may indicate 10 mW. The TX power may be represented based on a predefined unit and base. For example, 10 may indicate (10+base) mW, where the base may be a number such as 20. The TX power may be represented based on a predefined unit and a relative value. For example, 10 may mean 10 dB compared to 1 mW, which would give 10 mW. In some embodiments, the transmit power may be determined by the master station 102. In some embodiments, the transmit power may be determined by the wireless protocol such as IEEE 802.11ax.

The method 700 may continue at operation 706 with spatially reuse a sub-channel. For example, TX2 802.2 may identify a spatial reuse opportunity by a preamble from a packet from TX1 802.1. TX2 802.2 may then spatially re-use a sub-channel in use by TX1 802.1. In some embodiments, TX2 802.2 may first adjust the transmission power or adjust the clear channel assessment (CCA) before spatially re-using a sub-channel. The TX2 802.2 may only spatially reuse the sub-channel if TX2 802.2 to use a D2D link.

Figure 11:
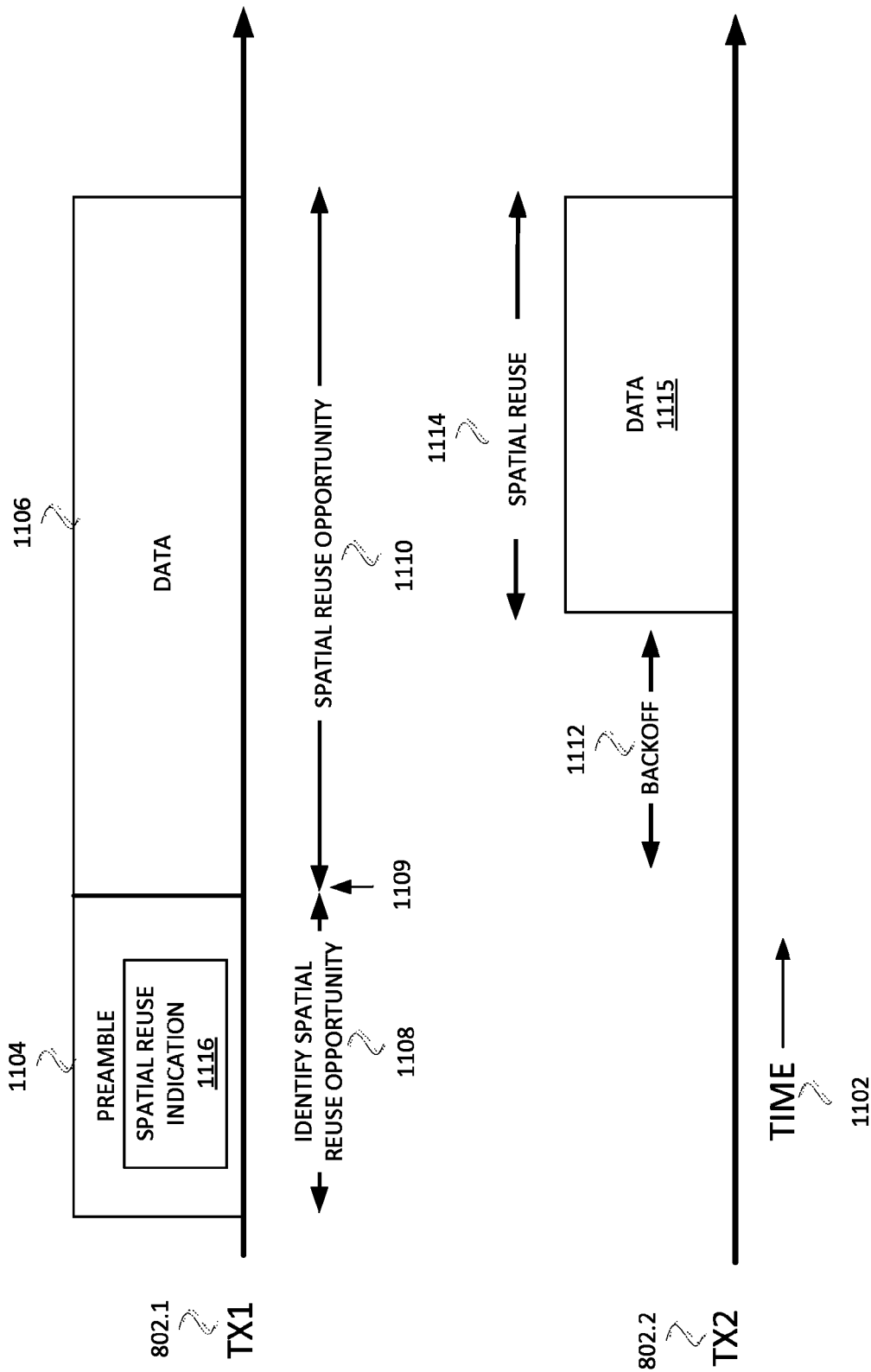
FIG. 11 illustrates a method of spatial reuse in accordance with some embodiments.

Operation 706 is described in conjunction with FIG. 11. FIG. 11 illustrates a method of spatial reuse in accordance with some embodiments. Illustrated in FIG. 11 is time 1102 along a horizontal axis and the transmitter along the vertical axis. The transmitter TX1 802.1 transmits on a sub-channel a preamble 1104 which may include a spatial reuse indication 1116. The spatial reuse indication may include one or more bits that indicate that TX1 802.1 has determined that another device such as a HEW station 104 may reuse the sub-channel being used by TX1 802.1. The spatial reuse indication 1116 may include an indication of M 902, 1002 as described in conjunction with FIGS. 9 and 10. TX1 802.1 may transmit data 1106 which may be a packet such as data or another type of packet. TX1 802.1 may only indicate that there is a spatial reuse opportunity 1110 in the spatial reuse indication 1116 if link1 806.1 is a D2D link. The spatial reuse indication 1116 may include an indication of the transmission power used to transmit the preamble 1104.

TX2 802.2 may receive the preamble 1104 and may identify a spatial reuse opportunity 1110 based on the preamble 1104. The TX2 802.2 may not be able to identify the spatial reuse opportunity 1110 until time 1109. At time 1109 the TX2 802.2 may have received the preamble 1104 and determined that a spatial reuse opportunity 1110 exits. The spatial reuse opportunity 1110 may be a duration that is based on the time to transmit packet 1106 and may be the same sub-channel in use by TX1 802.1. TX2 802.2 may then backoff 1112 in accordance with IEEE 802.11 communications protocol. In some embodiments, TX2 802.2 may adjust the size of the backoff 1112 or may not backoff 1112. TX2 802.2 may adjust the transmission power or CCA parameters, which may be based on information in the spatial reuse indication 1116. TX2 802.2 may then transmit data 1115 during the spatial reuse 1114. Data 1115 may be a packet. Spatial reuse 1114 may extend past spatial reuse opportunity 1110 in accordance with some embodiments. Data 1115 may end before the end of the spatial reuse opportunity 1110. TX2 802.2 may only utilize the spatial reuse opportunity 1110 if link2 806.2 is a D2D link.

TX2 802.2 may ignore a medium busy condition if it uses another mechanism to determine if there are additional gains and TX2 802.2 does not affect existing transmissions. TX2 802.2 may adjust the window size for backoff 1112 prior to performing a backoff 1112. The window size may be based on the spatial reuse indication 1116. The window size may be only for the spatial reuse opportunity 1110 and TX2 802.2 may revert to the previous window size after the spatial reuse opportunity 1110. In some embodiments, TX2 802.2 may not reset the window size after the data 1115 transmission to insure that other devices have a fair opportunity to use the sub-channel or wireless medium.

In some embodiments, RX2 804.2 may perform adjustments to CCA and/or the power transmission level for the spatial reuse opportunity 1110 based on control frames received from TX2 802.2. In some embodiments, RX2 804.2 may ignore the network allocation vector (NAV) and respond to control frames from TX2 802.2 such as a CTS for spatial reuse.

Figure 12:
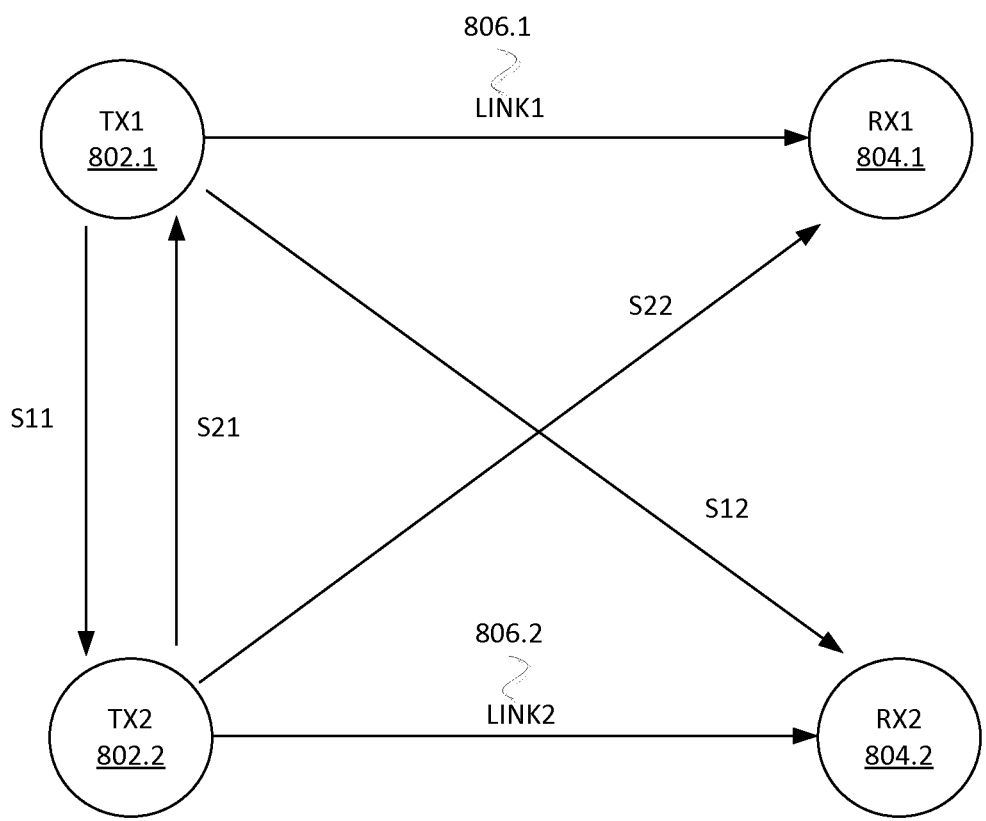
FIG. 12 illustrates the two links illustrated in FIG. 8 with signal strengths in accordance with some embodiments.

FIG. 12 illustrates the two links 806 illustrated in FIG. 8 with signal strengths in accordance with some embodiments. S11 is the signal strength from TX1 802.1 to TX2 802.2. S12 is the signal strength from TX1 802.1 to RX2 804.2. S21 is the signal strength from TX2 802.2 to TX1 802.1. S22 is the signal strength from TX2 802.2 to RX1 804.1.

When TX2 802.2 receives the preamble 1104 from TX1 802.1, the signal strength is S11. If the power difference between TX1 802.1 and TX2 802.2 is D=P1−P2, then the signal strength S21 is S11−D, where P1 is the transmission power of TX1 802.1 and P2 is the transmission power of TX2 802.2. In some embodiments, since link1 806.1 is a D2D link, TX2 802.2 may assume that TX1 802.1 and RX1 804.1 are close. RX1 804.1 may then assume that signal values S21 and S22 have values that are close to one another. TX2 802.2 can then infer its signal strength S21 or interference to RX1 804.1 based on the received signal strength S11. In some embodiments, TX2 802.2 may approximate signal strength S22 as equal to signal strength S11 if link2 806.2 is a D2D link.

TX2 802.2 may adjust its power transmission for the spatial reuse 1114 in some embodiments as follows. TX2 802.2 receives M 902 in the spatial reuse indication 1116. TX2 802.2 may estimate signal strength S21 as S11−D, where D is the power difference between TX1 802.1 and TX2 802.2. TX2 802.2 may estimate the additional interference above M of RX1 804.1 as A=521−M=S11−D−M=S11−(P1−P2)−M. TX2 802.2 may reduce power to some value larger than A+K, if A+K>0, where K can be a constant. TX2 802.2 may select a MCS based on the final transmission power and the average interference reported by RX2 804.2. TX2 802.2 may reduce the transmission power only for the spatial reuse 1114.

TX2 802.2 may adjust its power transmission for the spatial reuse 1114 in some embodiments as follows. TX2 802.2 may use a known threshold L for HEW stations 104. L may be determined by a communication protocol and may be predefined. TX2 802.2 may receive M 902 in the spatial reuse indication 1116. M may be equal to tolerable interference—(L−P1) rather than M being equal to tolerable interference. TX2 802.2 may estimate S21=S11−(L−P2) rather than S21=S11−D. TX2 802.2 may estimate the additional interference above the tolerable interference of RX1 804.1 as A=S21−M=S11−(L−P2)—tolerable interference+(L−P1)= S11−(P1−P2)—tolerable interference. TX2 802.2 may reduce power to some value larger than A+K, if A+K>0, where K can be a constant. TX2 802.2 may select a MCS based on the final transmission power and the average interference reported by RX2 804.2. TX2 802.2 may reduce the transmission power only for the spatial reuse 1114.

In some embodiments, TX2 802.2 may adjust the CCA as follows. TX2 802.2 may determine the additional interference that RX1 804.1 can tolerate by using M 1002 transmitted by TX1 802.1 and based on link1 806.1 being a D2D link. TX2 802.2 may only use the spatial reuse opportunity 1110 if link2 806.2 is also a D2D link. TX2 802.2 may increase CCA by M−D, where D is the transmission power difference between TX1 802.1 and TX2 802.2. TX2 802.2 may select a MCS based on the final transmission power and the average interference reported by RX2 804.2. In some embodiments, TX2 802.2 may increase CCA only for the spatial reuse 1114.

Example embodiments improve throughput performance of network 100 through spatial reuse. Example embodiments, may operate in a dense environment, where the SNR is usually very high due to short distance (around 5 to 10 m), and the defined signal detect CCA level (−82 dBm) for medium access may be too low for spatial reuse under high SNR. Example embodiments increase the CCA level, which increases the throughput performance due to spatial reuse.

Some legacy device 106 may experience a preamble error probability that is very high due to partial overlapped transmissions. As a result legacy devices 106 use aggressive energy detect (ED) CCA level (−62 dBm) for medium access most of the time, and the system medium access opportunity is already controlled by high CCA level. As a result, the interference level of system is at high level such that high rate, parallel transmissions are almost impossible.

In example embodiments, a mid-packet detect mechanism is used to signal medium busy to fine tune the spatial reuse opportunity and to reach a right balance for spatial reuse.

In a dense environment (see FIG. 2), D2D links may have even higher SNRs, e.g. 60 dB due to extremely short distance (around 0.5 to 3 m) such that they can tolerate much higher interference level than others even at a reduced transmission power level.

In some embodiments, HEW devices 104 may use a mid-packet detect mechanism to signal medium busy. In example embodiments, throughput may be improved by not relying on signaling such as request-to-send and clear-to-send which may add overhead and restrict the applicability of spatial reuse.

Figure 13:
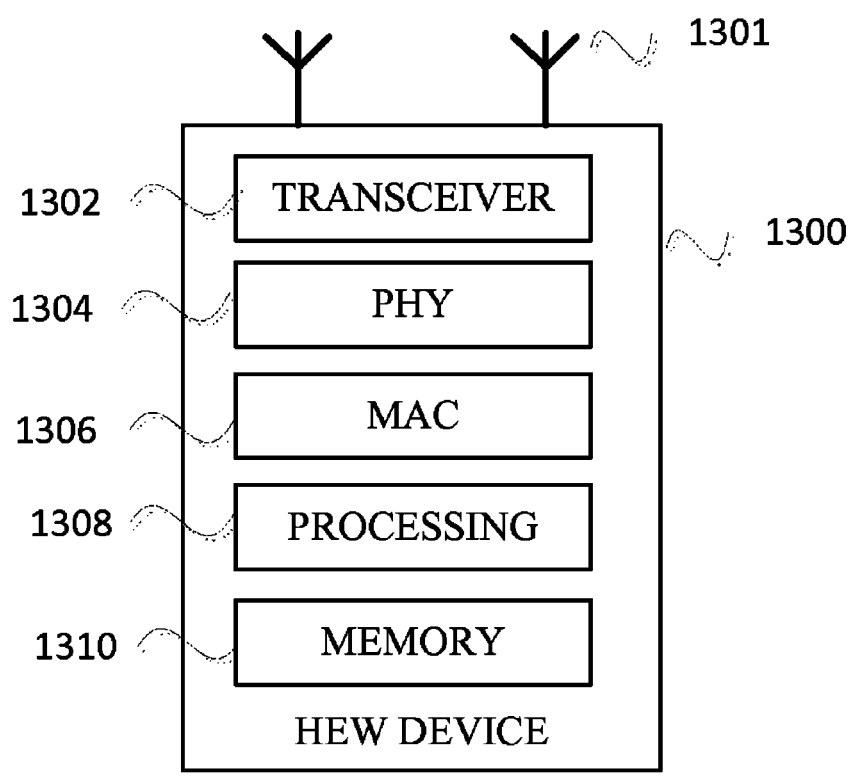
FIG. 13 illustrates a HEW device in accordance with some embodiments.

FIG. 13 illustrates a HEW device in accordance with some embodiments. HEW device 1300 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 1300 may be suitable for operating as master station 102 (FIG. 1) or a HEW STA 104 (FIG. 1). In accordance with embodiments, HEW device 1300 may include, among other things, a transmit/receive element 1301 (for example an antenna), a transceiver 1302, physical (PHY) circuitry 1304, and media access control (MAC) circuitry 1306. PHY circuitry 1304 and MAC circuitry 1306 may be HEW compliant layers and may also be compliant with one or more legacy IEEE 802.11 standards. MAC circuitry 1306 may be arranged to configure packets such as a physical layer convergence procedure (PLCP) protocol data unit (PPDUs) and arranged to transmit and receive PPDUs, among other things. HEW device 1300 may also include circuitry 1308 and memory 1310 configured to perform the various operations described herein. The circuitry 1308 may be coupled to the transceiver 1302, which may be coupled to the transmit/receive element 1301. While FIG. 13 depicts the circuitry 1308 and the transceiver 1302 as separate components, the circuitry 1308 and the transceiver 1302 may be integrated together in an electronic package or chip.

In some embodiments, the MAC circuitry 1306 may be arranged to contend for a wireless medium during a contention period to receive control of the medium for the HEW control period and configure an HEW PPDU. In some embodiments, the MAC circuitry 1306 may be arranged to contend for the wireless medium based on channel contention settings, a transmitting power level, and a CCA level.

The PHY circuitry 1304 may be arranged to transmit the HEW PPDU. The PHY circuitry 1304 may include circuitry for modulation/demodulation, upconversion/downconversion, filtering, amplification, etc. In some embodiments, the circuitry 1308 may include one or more processors. The circuitry 1308 may be configured to perform functions based on instructions being stored in a RAM or ROM, or based on special purpose circuitry. The circuitry 1308 may be termed processing circuitry in accordance with some embodiments. The circuitry 1308 may include a processor such as a general purpose processor or special purpose processor. The circuitry 1308 may implement one or more functions associated with transmit/receive elements 1301, the transceiver 1302, the PHY circuitry 1304, the MAC circuitry 1306, and/or the memory 1310.

In some embodiments, the circuitry 1308 may be configured to perform one or more of the functions and/or methods described herein and/or in conjunction with FIGS. 1-13 such as identifying spatial reuse opportunities, signaling spatial reuse opportunities, and spatially reusing one or more channels.

In some embodiments, the transmit/receive elements 1301 may be two or more antennas that may be coupled to the PHY circuitry 1304 and arranged for sending and receiving signals including transmission of the HEW packets. The transceiver 1302 may transmit and receive data such as HEW PPDU and packets that include an indication that the HEW device 1300 should adapt the channel contention settings according to settings included in the packet. The memory 1310 may store information for configuring the other circuitry to perform operations for configuring and transmitting HEW packets and performing the various operations to perform one or more of the functions and/or methods described herein and/or in conjunction with FIGS. 1-13 such as identifying spatial reuse opportunities, signaling spatial reuse opportunities, and spatially reusing one or more channels.

In some embodiments, the HEW device 1300 may be configured to communicate using OFDM communication signals over a multicarrier communication channel. In some embodiments, HEW device 1300 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 1300 may use 4× symbol duration of 802.11n or 802.11ac.

In some embodiments, an HEW device 1300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 1301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 1300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is an apparatus of a high efficiency station (HE STA). The apparatus including circuitry configured to: determine if a link with a wireless device is a device-to-device (D2D) link with a spatial reuse opportunity; and transmit a packet that includes an indication that there is the spatial reuse opportunity for the duration of the packet, if the link with the wireless device is the D2D link with the spatial reuse opportunity.

In Example 2, the subject matter of Example 1 can optionally include where the indication includes a margin that indicates at least one of the following group: an additional interference that can be tolerated by the HE STA, a tolerable interference level above a base threshold, and a tolerable interference level minus a transmission power.

In Example 3, the subject matter of Examples 1 and 2 can optionally include where the indication includes one of the following group: an indication of a transmission power for a second HE STA to use in the spatial reuse opportunity and a tolerable interference level plus the transmission power of the HE STA.

In Example 4, the subject matter of any of Examples 1-3 can optionally include where the circuitry is further configured to determine the link with the wireless device is the D2D link with the spatial reuse opportunity based on a signal strength received from the wireless device and a transmission power of the wireless device.

In Example 5, the subject matter of any of Examples 1-4 can optionally include where the circuitry is further configured to determine the link with the wireless device is the D2D link with the spatial reuse opportunity based on a determination by the wireless device.

In Example 6, the subject matter of any of Examples 1-5 can optionally include where the indication that there is the spatial reuse opportunity is to be transmitted in a HE signal (SIG) preamble.

In Example 7, the subject matter of any of Examples 1-6 can optionally include where the circuitry is further configured to determine the link with the wireless device is the D2D link with the spatial reuse opportunity based on an indication of a signal strength received by the wireless device from the HE STA.

In Example 8, the subject matter of any of Examples 1-7 can optionally include where the wireless device is one from the following group: a legacy device, a second HE STA, and a master station.

In Example 9, the subject matter of any of Examples 1-8 can optionally include where the circuitry is further configured to transmit and receive in accordance with orthogonal frequency division multiple access (OFDMA).

In Example 10, the subject matter of Example 9 can optionally include where the circuitry is further configured to transmit on a sub-channel in accordance with OFDMA.

In Example 11, the subject matter of Example 9 can optionally include where the circuitry is further configured to operate in accordance with Institute of Electrical and Electronic Engineering (IEEE) 802.11ax.

In Example 12, the subject matter of any of Examples 1-11 can optionally include where the circuitry is further configured to transmit an indication that the link with the wireless device is not the D2D link with the spatial reuse opportunity, if the link with the wireless device is not the D2D link with the spatial reuse opportunity.

In Example 13, the subject matter of any of Examples 1-12 can optionally include where the circuitry further comprises processing circuitry and transceiver circuitry.

In Example 14, the subject matter of Example 13 can optionally include memory and a transceiver coupled to the circuitry; and, one or more antennas coupled to the transceiver.

Example 15 is a method performed by a high efficiency station (HE STA). The method includes determining if a link with a wireless device is a device-to-device (D2D) link with a spatial reuse opportunity; and transmitting a packet that includes an indication that there is the spatial reuse opportunity for the duration of the packet, if the link with the wireless device is the D2D link with the spatial reuse opportunity.

In Example 16, the subject matter of Examples 15 can optionally include where the indication includes a margin that indicates at least one of the following group: an additional interference that can be tolerated by the HE STA, a tolerable interference level above a base threshold, and a tolerable interference level minus a transmission power.

In Example 17, the subject matter of Examples 15 or 16 can optionally include where the indication includes one of the following group: an indication of a transmission power for a second HE STA to use in the spatial reuse opportunity and a tolerable interference level plus the transmission power of the HE STA.

In Example 18, the subject matter of any of Examples 15-17 can optionally include where determining further comprises: determining the link with the wireless device is the D2D link with the spatial reuse opportunity based on a signal strength received from the wireless device and a transmission power of the wireless device.

In Example 19, the subject matter of any of Examples 15-18 can optionally include where determining further comprises: determining the link with the wireless device is the D2D link with the spatial reuse opportunity based on an indication of a signal strength received by the wireless device from the HE STA.

Example 20 is an apparatus of a high efficiency station (HE STA). The apparatus includes circuitry configured to: receive a first packet from a second HE STA, wherein the first packet includes an indication that there is a spatial opportunity for the duration of the packet; adjust at least one of the following group: a transmit power and a clear channel assessment; and transmit a second packet to a wireless device in the spatial opportunity in accordance with device-to-device communication, where the first packet is received on a sub-channel and the second packet is to be transmitted on the same sub-channel, and where the circuitry is further configured to operate in accordance with orthogonal frequency division multiple access (OFDMA).

In Example 21, the subject matter of Example 20 can optionally include where the indication includes an indication of how much additional interference the second HE STA can tolerate, and where the circuitry is further configured to reduce the transmit power of the HE STA based on the indication of how much additional interference the second HE STA can tolerate and further based on a signal strength of the first packet from the second HE STA.

In Example 22, the subject matter of Examples 20 or 21 can optionally include where the indication includes an indication of how much additional interference the second HE STA can tolerate, and where the circuitry is further configured to increase a signal detect level of the clear channel assessment based on the indication of how much additional interference the second HE STA can tolerate and further based on a signal strength of the first packet from the second HE STA, and where the circuitry is further configured to perform a mid-packet detect to determine if a wireless medium is busy.

In Example 23, the subject matter of any of Examples 20-22 can optionally include memory coupled to the circuitry, a transceiver coupled to the circuitry; and one or more antennas coupled to the transceiver.

Example 24 is a non-transitory computer-readable storage medium that stores instructions for execution by one or more processors to perform operations for device-to-device spatial reuse on a high efficiency station (HE STA). The operations configure the HE STA to: determine if a link with a wireless device is a device-to-device (D2D) link with a spatial reuse opportunity; and transmit a packet that includes an indication that there is the spatial reuse opportunity for the duration of the packet, if the link with the wireless device is the D2D link with the spatial reuse opportunity.

In Example 25, the subject matter of Example 24 can optionally include where the indication includes at least one from the following group: a margin that indicates an additional interference that can be tolerated by the HE STA, a margin that indicates a tolerable interference level above a base threshold, and an indication of a transmission power for a second HE STA to use in the spatial reuse opportunity.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high efficiency station (HE STA), the HE STA configured to operate in a wireless local-area network (WLAN), the apparatus comprising: a memory; and circuitry coupled to the memory, the circuitry configured to:
    determine if a link with a wireless device is a device-to-device (D2D) link with a spatial reuse opportunity; and
    configure the HE STA to transmit a packet that includes an indication that there is the spatial reuse opportunity for the duration of the packet, if the link with the wireless device is the D2D link with the spatial reuse opportunity.

2. The apparatus of the HE STA of claim 1, wherein the indication includes a margin that indicates at least one of the following group:
    an additional interference that can be tolerated by the HE STA, a tolerable interference level above a base threshold, and a tolerable interference level minus a transmission power.

3. The apparatus of the HE STA of claim 1, wherein the indication includes one of the following group:
    an indication of a transmission power for a second HE STA to use in the spatial reuse opportunity and a tolerable interference level plus the transmission power of the HE STA.

4. The apparatus of the HE STA of claim 1, wherein the circuitry is further configured to determine the link with the wireless device is the D2D link with the spatial reuse opportunity based on a signal strength received from the wireless device and a transmission power of the wireless device.

5. The apparatus of the HE STA of claim 1, wherein the circuitry is further configured to determine the link with the wireless device is the D2D link with the spatial reuse opportunity based on a determination by the wireless device.

6. The apparatus of the HE STA of claim 1, wherein the indication that there is the spatial reuse opportunity is to be transmitted in a HE signal (SIG) preamble.

7. The apparatus of the HE STA of claim 1, wherein the circuitry is further configured to determine the link with the wireless device is the D2D link with the spatial reuse opportunity based on an indication of a signal strength received by the wireless device from the HE STA.

8. The apparatus of the HE STA of claim 1, wherein the wireless device is one from the following group:
    a legacy device, a second HE STA, and a master station.

9. The apparatus of the HE STA of claim 1, wherein the circuitry is further configured to transmit and receive in accordance with orthogonal frequency division multiple access (OFDMA).

10. The apparatus of the HE STA of claim 9, wherein the circuitry is further configured to transmit on a sub-channel in accordance with OFDMA.

11. The apparatus of the HE STA of claim 9, wherein the circuitry is further configured to operate in accordance with Institute of Electrical and Electronic Engineering (IEEE) 802.11ax.

12. The apparatus of the HE STA of claim 1, wherein the circuitry is further configured to transmit an indication that the link with the wireless device is not the D2D link with the spatial reuse opportunity, if the link with the wireless device is not the D2D link with the spatial reuse opportunity.

13. The apparatus of the HE STA of claim 1, wherein the circuitry further comprises processing circuitry and transceiver circuitry.

14. The apparatus of the HE STA of claim 13, further comprising a transceiver coupled to the circuitry; and,
    one or more antennas coupled to the transceiver.

15. A method performed by an apparatus of a high efficiency station (HE STA), the HE STA configured to operate in a wireless local-area network (WLAN), the method comprising:
    determining if a link with a wireless device is a device-to-device (D2D) link with a spatial reuse opportunity; and
    transmitting a packet that includes an indication that there is the spatial reuse opportunity for the duration of the packet, if the link with the wireless device is the D2D link with the spatial reuse opportunity.

16. The method of claim 15, wherein the indication includes a margin that indicates at least one of the following group:
    an additional interference that can be tolerated by the HE STA, a tolerable interference level above a base threshold, and a tolerable interference level minus a transmission power.

17. The method of claim 15, wherein the indication includes one of the following group:
an indication of a transmission power for a second HE STA to use in the spatial reuse opportunity and a tolerable interference level plus the transmission power of the HE STA.

18. The method of claim 15, wherein determining further comprises:
determining the link with the wireless device is the D2D link with the spatial reuse opportunity based on a signal strength received from the wireless device and a transmission power of the wireless device.

19. The method of claim 15, wherein determining further comprises:
determining the link with the wireless device is the D2D link with the spatial reuse opportunity based on an indication of a signal strength received by the wireless device from the HE STA.

20. An apparatus of a high efficiency station (HE STA), the HE STA configured to operate in a wireless local-area network (WLAN), the apparatus comprising: memory; and circuitry coupled to the memory, the circuitry configured to:
decode a first packet from a second HE STA, wherein the first packet includes an indication that there is a spatial opportunity for the duration of the packet;
adjust at least one of the following group:
a transmit power and a clear channel assessment; and
configure the HE STA to transmit a second packet to a wireless device in the spatial opportunity in accordance with device-to-device communication, wherein the first packet is received on a sub-channel and the second packet is to be transmitted on the same sub-channel, and wherein the circuitry is further configured to operate in accordance with orthogonal frequency division multiple access (OFDMA).

21. The apparatus of the HE STA of claim 20, wherein the indication includes an indication of how much additional interference the second HE STA can tolerate, and wherein the circuitry is further configured to reduce the transmit power of the HE STA based on the indication of how much additional interference the second HE STA can tolerate and further based on a signal strength of the first packet from the second HE STA.

22. The apparatus of the HE STA of claim 20, wherein the indication includes an indication of how much additional interference the second HE STA can tolerate, and wherein the circuitry is further configured to increase a signal detect level of the clear channel assessment based on the indication of how much additional interference the second HE STA can tolerate and further based on a signal strength of the first packet from the second HE STA, and wherein the circuitry is further configured to perform a mid-packet detect to determine if a wireless medium is busy.

23. The apparatus of the HE STA of claim 20, further comprising memory coupled to the circuitry, a transceiver coupled to the circuitry; and
one or more antennas coupled to the transceiver.

24. A non-transitory computer-readable storage medium that stores instructions for execution by one or more processors to perform operations for device-to-device spatial reuse on an apparatus of a high efficiency station (HE STA), the HE STA configured to operate in a wireless local-area network (WLAN), the operations to configure the apparatus of the HE STA to:
determine if a link with a wireless device is a device-to-device (D2D) link with a spatial reuse opportunity; and
transmit a packet that includes an indication that there is the spatial reuse opportunity for the duration of the packet, if the link with the wireless device is the D2D link with the spatial reuse opportunity.

25. The non-transitory computer-readable storage medium of claim 24, wherein the indication includes at least one from the following group:
a margin that indicates an additional interference that can be tolerated by the HE STA, a margin that indicates a tolerable interference level above a base threshold, and an indication of a transmission power for a second HE STA to use in the spatial reuse opportunity.

* * * * *